United States Patent [19]

Imaseki

[11] Patent Number: 4,949,097

[45] Date of Patent: Aug. 14, 1990

[54] THERMAL PRINTER

[75] Inventor: Chiharu Imaseki, Osaka, Japan

[73] Assignee: Minolta Camera Kabushiki Kaisha, Osaka, Japan

[21] Appl. No.: 363,990

[22] Filed: Jun. 9, 1989

[30] Foreign Application Priority Data

Jun. 10, 1988 [JP] Japan ................................ 63-143899

[51] Int. Cl.[5] ........................... G01D 15/10; B41J 3/20

[52] U.S. Cl. ................................ 346/76 PH; 400/120

[58] Field of Search ..................... 346/76 PH; 400/120

[56] References Cited

U.S. PATENT DOCUMENTS 4,586,834 5/1986 Hachisuga et al. ............ 346/76 PH 4,768,039 8/1988 Akutagawa et al. .......... 346/76 PH

FOREIGN PATENT DOCUMENTS 0213172 9/1986 Japan ............................. 346/76 PH 61-213172 9/1986 Japan .

*Primary Examiner*—Bruce A. Reynolds

*Assistant Examiner*—Huan Tran

*Attorney, Agent, or Firm*—Burns, Doane, Swecker & Mathis

[57] ABSTRACT

A thermal printer changeable over between a thermal transfer printing mode and a thermosensible printing mode is disclosed. A printing mode is automatically selected by detecting the presence/absence of an ink ribbon. The level of energy applied to a thermal head is changed in accordance with the above selection.

14 Claims, 13 Drawing Sheets

THERMAL PRINTER

BACKGROUND OF THE INVENTION (1) Field of the Invention

The present invention relates to a thermal printer, and more particularly to a thermal printer changeable over between a thermal transfer printing mode in which printing is effected by transferring ink of an ink ribbon onto a plain paper and a thermosensible printing mode in which printing is effected on a thermosensible paper without using the ink ribbon.

(2) Description of the Related Art

In general, with a thermal printer which effects printing by heat-fusing ink of an ink ribbon by a thermal head and transferring the heat-fused ink onto a plain paper, an expensive ink ribbon is consumed each time the printing is effected. This results in an extremely high running cost. Therefore, there has been a desire to effect a test printing using a thermosensible paper, which is low in cost, before the printing operation using the ink ribbon.

A conventional thermal printer, however, effects the thermosensible printing in the same condition as the thermal transfer printing (for example, voltage applied to the thermal head is not controlled). Therefore, energy is consumed wastely and the printing operation takes a long time.

SUMMARY OF THE INVENTION

A primary object of the present invention, therefore, is to provide a thermal printer changeable over between a thermal transfer printing mode and a thermosensible printing mode, effecting a printing operation efficiently by changing the level of energy applied to a thermal head, and having an improved operability.

Another object of the present invention is to provide a thermal printer capable of accurately detecting whether an ink ribbon is loaded in the printer or not.

A still another object of the present invention is to provide a thermal printer in which a cassette containing the ink ribbon is loaded and unloaded smoothly.

A still further object of the present invention is to provide a thermal printer capable of discriminating a monochromatic ink ribbon from a color ink ribbon with high accuracy.

The above objects are fulfilled, according to the present invention, by a thermal printer for printing on a recording paper both in a thermal transfer printing mode with an ink ribbon and in a thermosensible printing mode without an ink ribbon comprising a thermal head, energy applying means for changing the level of energy applied to the thermal head between the thermal transfer printing mode and the thermosensible printing mode ink ribbon detecting means for detecting whether the ink ribbon is loaded in the printer or not, automatic printing mode selecting means for selecting the thermal transfer printing mode when the ink ribbon is loaded in the printer and for selecting the thermosensible printing mode when the ink ribbon is not loaded in the printer ink ribbon transport means for transporting the ink ribbon, and driving prohibiting means for prohibiting driving of the ink ribbon transport means when the thermosensible printing mode is selected.

According to the above construction, selecting the thermosensible printing mode when the ink ribbon is not loaded in the printer leads to energy-saving. This energy-saving provides the advantages of reduction in a running cost and an efficient printing operation.

The ink ribbon transport means may comprise spindles for supporting the takeup roll at an accurate position, the spindles being engaged in both ends of the takeup roll when the ink ribbon is loaded in the printer, supporting means for slidably supporting each of the spindles between a first position where the spindle is engaged in the end of the takeup roll and a second position where the spindle is separated from the end of the takeup roll and a driving mechanism for driving the takeup roll when the takeup roll is supported by the spindles.

The thermal printer may further comprise means for connecting the spindles to the takeup roll by pressing the spindles responsive to the loading operation of the cassette.

According to the above construction, the spindle for transporting the ink ribbon is separated from the end of the takeup roll when the cassette containing the ink ribbon is not loaded in the printer, and is engaged in the end of the takeup roll when the cassette is loaded in the printer. This allows the cassette to be loaded and unloaded smoothly.

The ink ribbon detecting means may comprise a transmission type photosensor provided in the printer and an interrupting member for interrupting the optical path of the photosensor, the interrupting member being provided in the cassette containing the ink ribbon.

The ink ribbon detecting means may comprise a strip mark provided along one side of the ink ribbon and a mark detecting sensor for detecting the strip mark, the mark detecting sensor being provided in the printer.

According to the above construction, when the cassette containing the ink ribbon is loaded in the printer, the optical path of the photosensor is interrupted by the transmission type shielding member, whereby the presence/absence of the ink ribbon is detected.

The thermal printer may further comprise judging means for judging whether the ink ribbon is a color ink ribbon or a monochromatic ink ribbon.

The judging means may comprise a plurality of reflection type photosensors provided in the printer at positions corresponding to both side portions of the ink ribbon, a plurality of reflecting plates opposed to the plurality of reflecting type photosensors with the ink ribbon therebetween, and a discriminating circuit which discriminates the monochromatic ink ribbon by detection outputs of the reflection type photosensors when dark color marks formed on both sides of the monochromatic ink ribbon are positioned at detection areas of the photosensors and which discriminates the color ink ribbon by detection outputs of the photosensors when dark color marks formed at non-opposed positions on both sides of the color ink ribbon are positioned at the detection areas of the photosensors.

According to the above construction, detection patterns of the reflection type photosensor differs with the type of the ink ribbon. The monochromatic ink ribbon and the color ink ribbon are descriminated by means of the above differences.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Figure 1:
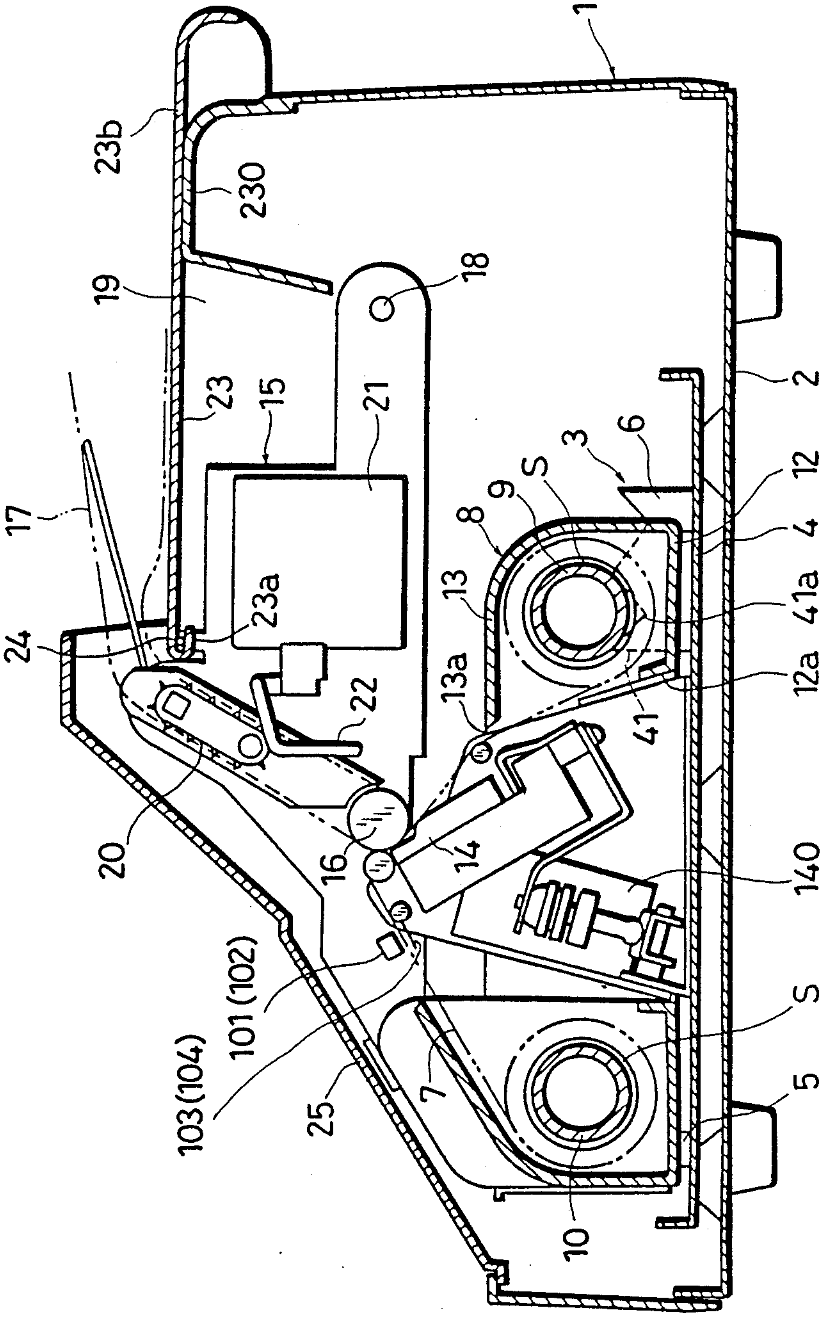
FIG. 1 is a view showing a thermal printer to which the present invention is applied.

FIG. 1 shows a thermal printer to which the present invention is applied. A cassette loading section 3 is provided on a bottom plate 2 of a case 1. A cassette 8 containing an ink ribbon 7 is removably held on a base plate 4 of the cassette loading section 3 by a polyurethane foam 5 and a rear positioning block 6.

Figure 2:
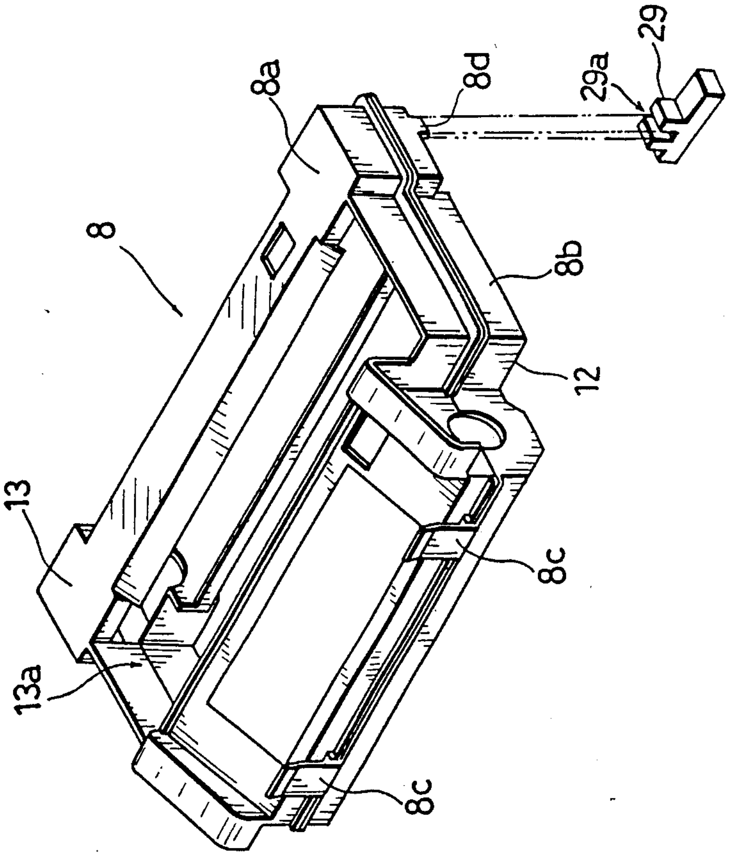
FIG. 2 is a perspective view of an ink ribbon cassette.
Figure 3:
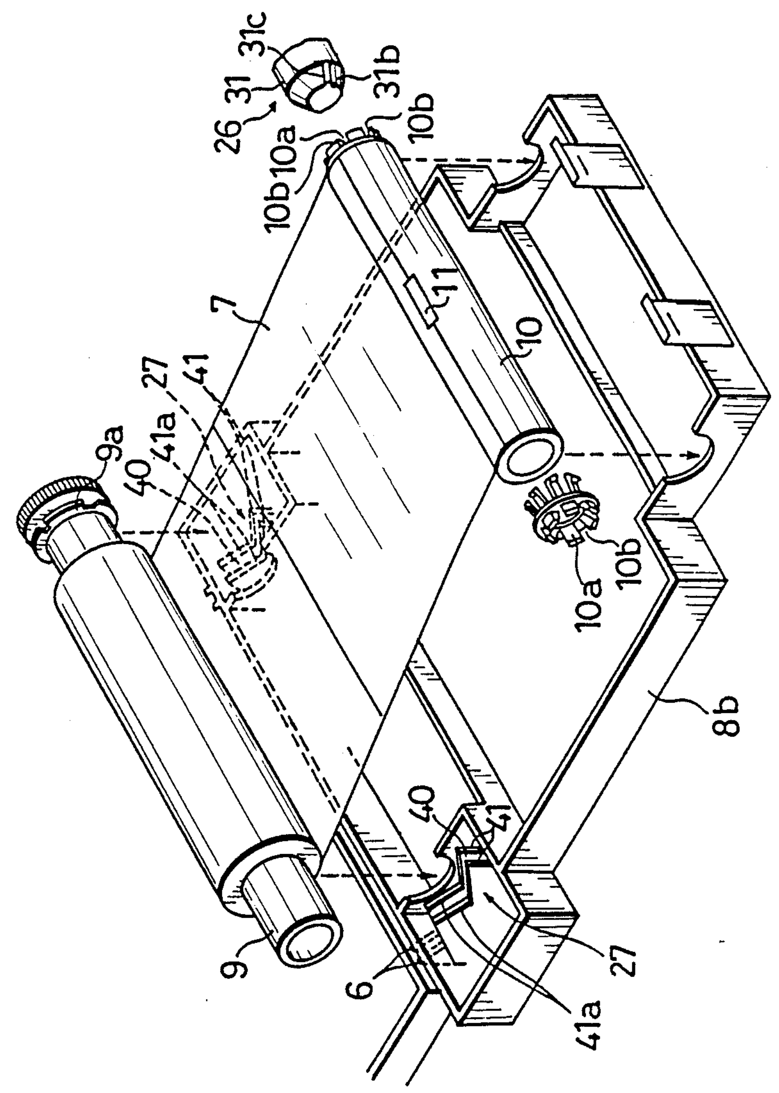
FIG. 3 is an exploded view showing an internal construction of the cassette.

The cassette 8 is formed of synthetic resin and, as shown in FIG. 2, has upper and lower halves 8a and 8b which are connected to each other at the rear ends thereof by connecting members(not shown). This construction allows the cassette 8 to be opened and closed. The closing state of the cassette 8 can be locked by engaging members 8c, 8c provided on a front surface thereof. The cassette 8 also includes a supply roll 9 and a takeup roll 10, each having a play S therebetween as shown in FIG. 1. The ink ribbon 7 is wound around the supply roll 9 , and has a leading end thereof connected to the takeup roll 10 by an adhesive tape 11 as shown in FIG. 3. Thus, the ink ribbon 7 is subjected to thermal transfer between the two rolls 9 and 10.

For the thermal transfer, the cassette 8 has windows 13a and 12a defined in central portions of a top plate 13 and a bottom plate 12 thereof, respectively. That is, when the cassette 8 is loaded between the polyurethane foam 5 of the base plate 4 and the rear positioning block 6, a thermal head 14 extends through the windows 12a and 13a of the bottom and top plates 12 and 13. The lower half 8b has on one side thereof a detection claw 8d as shown in FIG. 2. When the cassette 8 is loaded in the printer, the detection claw 8d enters in a central groove 29a of a photosensor 29 provided on the base plate 4 (refer to FIG. 2), whereby the optical path of the photosensor 29 is interrupted. Thus, whether the cassette 8 is loaded in the printer or not is detected.

The thermal head 14 pushes up the ink ribbon 7 between the rolls 9 and 10, thereby guiding the ink ribbon 7 through the window 13a above the top plate 13 of the cassette 8, as shown in FIG. 1. Thus, the ink ribbon 7 is pressure contacted on a platen roller 16 of a paper feeder block 15 provided in an upper portion of the case 1. At the position of the pressure contact, the thermal head 14 carries out the thermal transfer printing onto a recording paper 17 with the ink ribbon 7 (thermal transfer printing mode). When not printing, the thermal head 14 is separated from the platen roller 16. These pressure contact and separation of the thermal head 14 is effected by a driving means 140.

Figure 5:
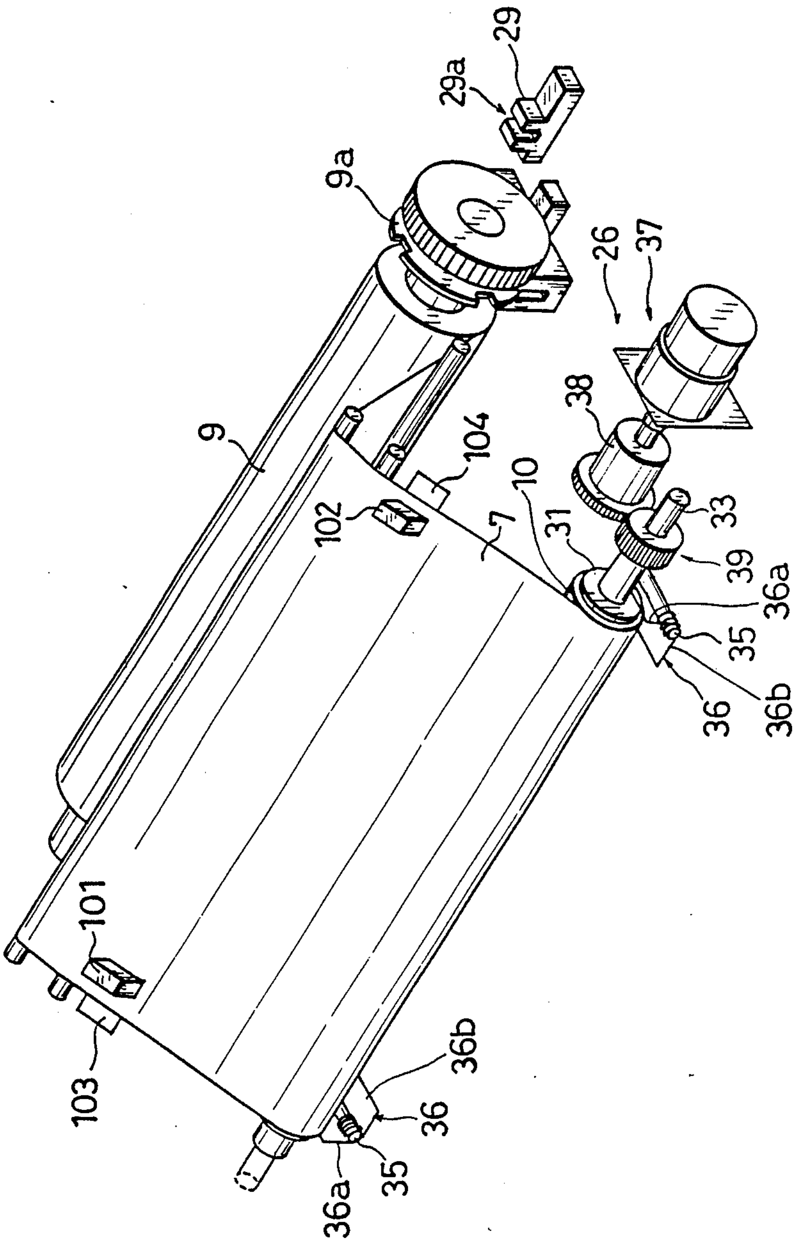
FIG. 5 is a view showing the construction of a ink ribbon driving section.

As shown in FIGS. 1 and 5, the printer includes mark detecting sensors 101 and 102 at positions corresponding to the side portions of the ink ribbon 7. The printer also includes reflecting plates 103 and 104 at positions opposed to the mark detecting sensors 101 and 102. The mark detecting sensors 101 and 102 are supported on a side wall of the case 1 and the reflecting plates 103 and 104 are attached to a base for supporting the thermal head 14. The mark detecting sensors 101 and 102 detect marks provided on both sides of the ink ribbon 7, thereby judging whether the ink ribbon 7 is a monochromatic ribbon or a color ribbon.

Figure 6B:
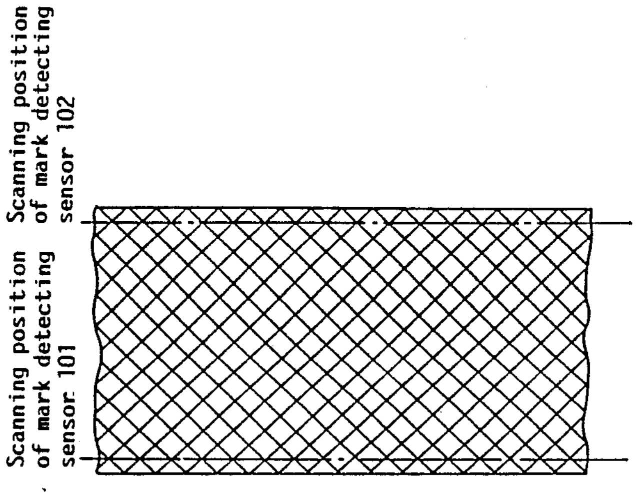
FIG. 6b is a plan view of a monochromatic ink ribbon.
Figure 6A:
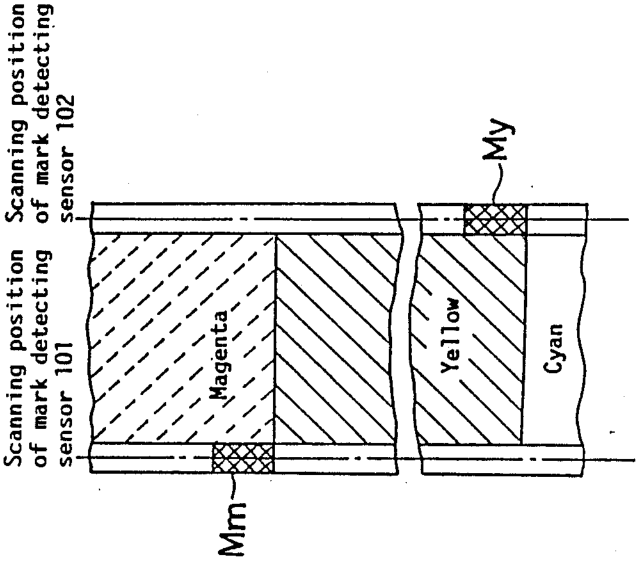
FIG. 6a is a plan view of a color ink ribbon.

The ink ribbon 7 is of either of the following two types: a color ink ribbon carrying inks of three colors, magenta, yellow and cyan by turns as shown in FIG. 6a and a monochromatic ink ribbon carrying black ink all along its surface as shown in FIG. 6b. The color ink ribbon 7 has a yellow leading end detecting mark My, a magenta leading end detecting mark Mm and a cyan leading end detecting mark Mc (not shown). The mark My is provided in a right transparent portion, of the yellow ink region, scanned by the mark detecting sensor 102 and other two marks are provided in left transparent portions, of the magenta and cyan ink regions, scanned by the mark detecting sensor 101. All the marks are black.

On the other hand, the monochromatic ink ribbon 7 carries black ink all along its surface scanned by the mark detecting sensors 101 and 102. Therefore, black/-white judgment patterns of the two detecting sensors 101 and 102 are different as shown in the following table depending on whether the ink ribbon contained in the cassette 8 is a color ink ribbon or a monochromatic ink ribbon. The ink ribbon type judgment is effected using the above differences.

TABLE 1

| Mark detecting sensor 101 | Mark detecting sensor 102 | Judgment |
|---|---|---|
| black | black | monochromatic ribbon |
| white | black | color ribbon(yellow) |
| black | white | color ribbon(magenta and cyan) |

Above the platen roller 16, the paper feeder block 15 has a tractor feeder 20 which is driven in synchronism with the platen roller 16 to feed the recording paper 17 to the platen roller 16. The tractor feeder 20 is pivotable about a rear hinge 18 between an operative position shown in FIG. 1 and a retracted position. The tractor feeder 20 pivots upward from the operative position through an upper opening 19 of the case 1 to the retracted position. Number 21 indicates a drive motor of the paper feeder block 15 and number 22 indicates a positioning sensor. A paper guide plate 23 provided above the paper feeder block 15 has a bent end portion 23a removably hooked to a pin 24 of the paper feeder block 15 and has a rear end 23b mounted on a top plate 230 of the case 1. According to this construction, the paper guide plate 23 is removable and pivotable about the pin 24, following the positional change of the tractor feeder 20.

A front cover 25 is removably mounted on the case 1 forwardly of the tractor feeder 20. The cassette loading section 3 is entirely exposed by removing the front cover 25 and swinging the tractor feeder 20 to the retracted position. Thus, the cassette 8 can be loaded and unloaded through a simple operation.

Figure 4:
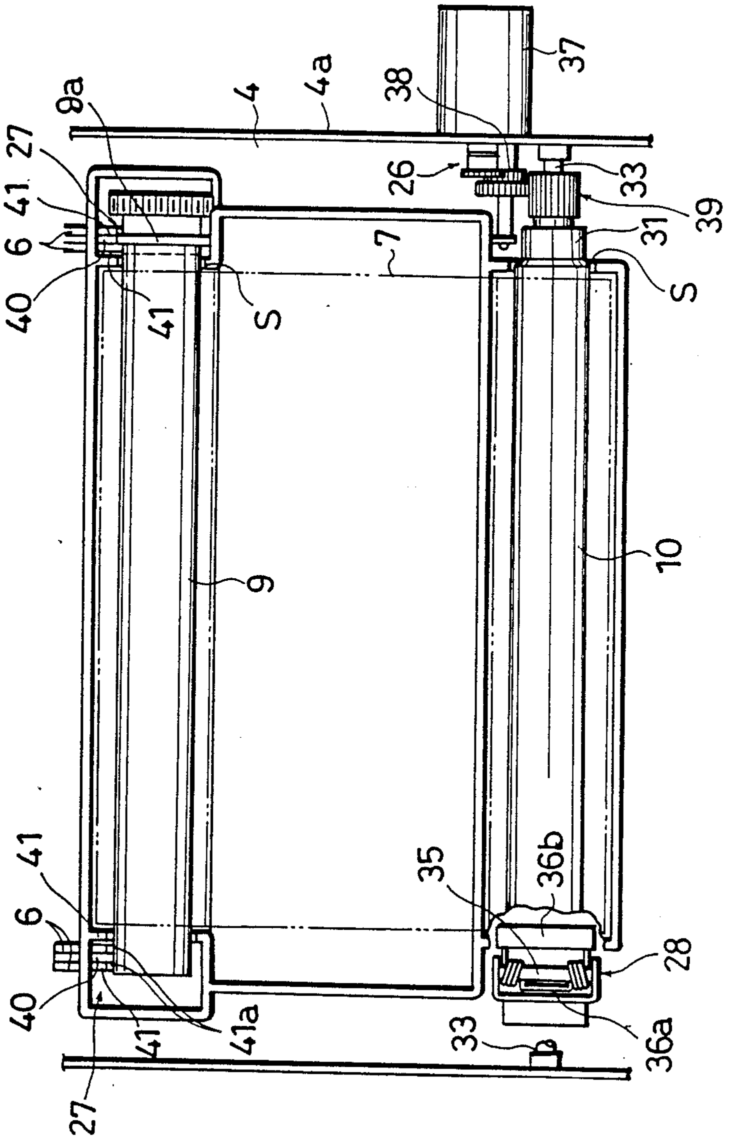
FIG. 4 is a view showing loading condition of the cassette in the printer.

The base plate 4, as shown in FIGS. 3 through 5, supports takeup means 26 provided near both ends of the takeup roll 10 of the cassette 8, positioning blocks 27 provided near both ends of the supply roll 9, connecting means 28 for connecting the takeup means 26 to the takeup roll 10 in accordance with the loading and unloading of the cassette 8, and the cassette detecting photosensors 29. With regard to some of the above components, only one is shown in the drawings.

The takeup means 26 have positioning spindles 31 (in the drawings, only one of them is shown) provided at positions opposite to both ends of the takeup roll 10 on substantially the same axis. Each spindle 31 projects from the side wall **4*a* of the base plate 4 inwardly as shown in FIG. 4 and is supported by a shaft 33 in such a manner that it is slidable in the axial direction of the shaft 33. Each spindle 31 is energized by a spring disposed within the spindle 31 to a retracted position. At this retracted position, the spindle 31 is separated from the end of the takeup roll 10 and does not interfere with the cassette 8 when the cassette 8** is loaded or unloaded.

The connecting means 28 includes spring levers 36, 36 which are supported on the base plate 4 by a shaft 35 below the spindle 31. The spring levers 36, 36 have L-shaped configurations in side views. One end **36*a* of the lever 36 is engaged in a peripheral circular groove (not shown) of the spindle 31 to move the spindle 31 in the axial direction. The other end 36*b* of the lever 36 receives the bottom of the cassette 8. When the cassette 8 is loaded, the end 36*b* is pressed downward by the cassette 8, whereby the end 36*a* which is pivotable with the shaft 35 presses the spindle 31 upon the end of the takeup roll 10. At this time, a male taper 31*b* of the spindle 31 is engaged in a female taper 10*a* attached to the end of the takeup roll 10 (connection stand-by state). After this stand-by state, the spindle 31 is completely connected to the female taper 10*a* by the following connection terminating operation. The force required to pivot the spring lever 36 is stronger than the weight of the cassette 8. Therefore, when the cassette 8 is placed in the cassette loading section 3, there still leaves a space between the cassette 8 and the base plate 4 on one side where the takeup roll 10 is provided. The loading of the cassette 8 is completed by swinging the tractor feeder 20 to the operative position shown in FIG. 1, thereby pushing the cassette 8 downward At this time, the levers 36 are further pivoted to press the spindles to the takeup roll (connection terminating operation). At the same time, the connection between the cassette 8 and the takeup means 26 and the positioning of the takeup roll 10 are automatically effected. This loading condition of the cassette 8 is maintained by locking the tractor feeder 20** at its operative position.

The takeup roller 10 is positioned on the base plate 4 by the the above connection terminating operation independenly of the cassette 8. After the cassette 8 is loaded in the printer, other necessary positionings are automatically effected in succession and driving force is transmitted from a motor 37 to one spindle 31.

On the other hand, when the tractor feeder 20 is swung to the retracted position, the cassette 8 is moved upward. The spindle 31 is moved back to the retracted position by the spring force of the spring disposed within the spindle 31. Thus, the spindle 31 is separated from the takeup roll 10, which enables the cassette 8 to be unloaded. At this time, the spring force of the spring lever 36 makes a space between the cassette 8 and the base plate 4 on one side where the takeup roll 10 is provided. This facilitates the unloading of the cassette 8.

The male taper **31*b* and the female taper 10*a* into which the male taper is engaged respectively have a projecting portion 31*c* and recesses 10*b* for easy driving force transmission from the spindle 31 to the takeup roll 10. The projecting portion 31*c* is engaged in the recess 10*b*. This engagement needs not be effected when the cassette 8 is loaded but is securely effected when the spindle 31 starts to pivot by the driving force applied thereto and rotates with the takeup roll 10**. This automatic ribbon takeup positioning/driving mechanism is disclosed in U.S. Pat. No. 4,768,039 in detail.

The transmission of driving force from the motor 37 to the spindle 31 is effected by a group of gears 39 through a friction clutch 38, as shown in FIG. 5. The driving speed is adjusted in order not to damage the ink ribbon 7. The positioning block 27 includes a pair of walls 41, 41 with a space 40 therebetween which are formed integrally with the block 6 for receiving the cassette 8. Each wall 41 has a V-shaped bearing **41*a* (FIG. 1). Both ends of the supply roll 9 are rotatably received by the bearings 41*a*, whereby the supply roll 9 is accurately positioned on the base plate 4 in a parallel relationship with the takeup roll 10**.

The supply roll 9 has a positioning flange **9*a* integrally formed at one end thereof. When the cassette 8 is loaded, this positioning flange 9*a* is engaged in the space 40, thereby positioning the supply roll 9 in the axial direction. On the other hand, as described above, the takeup roll 10 is positioned in the axial direction by pressing the spindles 31 upon the both ends thereof. In this way, the supply roll 9 and the takeup roll 10** are positioned in the axial direction.

As a result, when the takeup roll 10 is driven to rotate, the ink ribbon wound around the supply roll 9 is transported to the takeup roll 10 without winding or generating wrinkles. Then, the ink ribbon 7 is subjected to the thermal transfer at the fixed position without wrinkles and taken up by the takeup roll 10.

Figure 7:
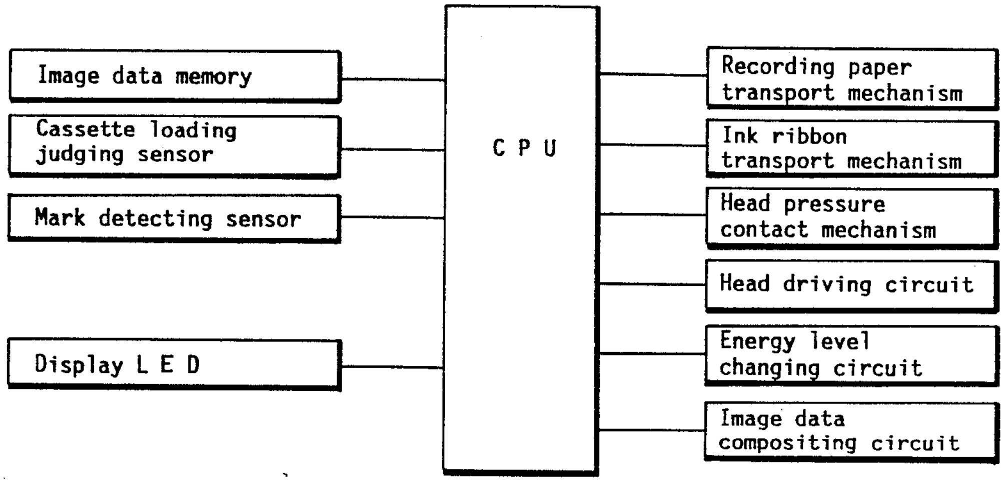
FIG. 7 is a block diagram showing a printer control circuit.
Figure 8:
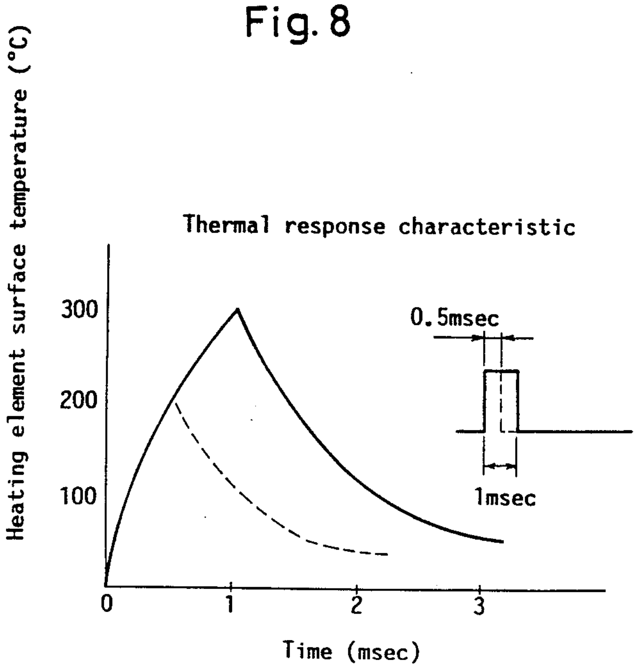
FIG. 8 is an explanatory view showing the operation of an energy level changing circuit.

FIG. 7 is a block diagram showing a control circuit of the above printer. An energy level changing circuit is provided for changing the level of energy applied to the thermal head depending on whether the printer is in the thermosensible printing mode or in the thermal transfer printing mode. In general, the thermosensible printing requires less energy than the thermal transfer printing. Therefore, it is advantageous to change the energy level by the above circuit. More particularly, the energy level is lowered by reducing the pulsewidth of a pulse for electrifying heating elements of the thermal head 14 as shown with a chained line in FIG. 8, or lowering the level of applied voltage. In FIG. 7, an image data memory is a memory for storing color data to be printed for colors magenta, cyan and yellow independently, and an image data compositing circuit is a circuit for compositing the color data to form black-and-white data for use in the thermosensible printing mode and in the thermal transfer printing mode with a monochromatic ink ribbon. A display LED is for displaying the result of the printing mode judgment and is provided on an operation panel.

Figure 9:
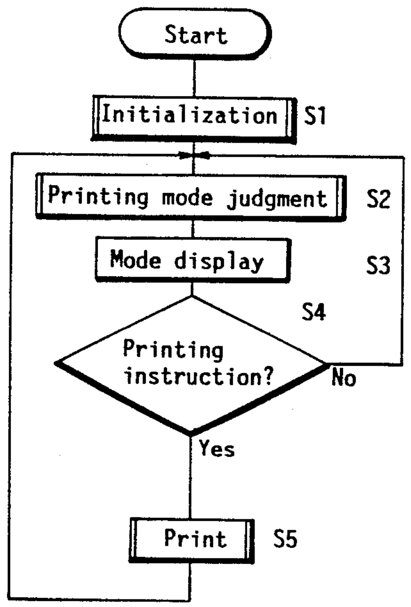
FIG. 9 is a flow chart showing a mainroutine of the operation of the printer.

FIG. 9 is a flowchart illustrating an operation of the printer having the above construction. When the power source is turned on, initialization is effected at step S1 and the printing mode is judged at step S2. At step S3, whether the printing mode is the thermosensible mode or the thermal transfer mode, and if the printer is in the latter mode, whether the ink ribbon is a color ink ribbon or a monochromatic ribbon are displayed. When a printing command is given, that is, when a print switch (not shown) on the operation panel is pressed or a print starting signal is input from an image processing device connected to the printer at step S4, a printing operation is effected in the predetermined mode at step S5. Thereafter, the operations from step S2 to step S5 are repeated.

Figure 10:
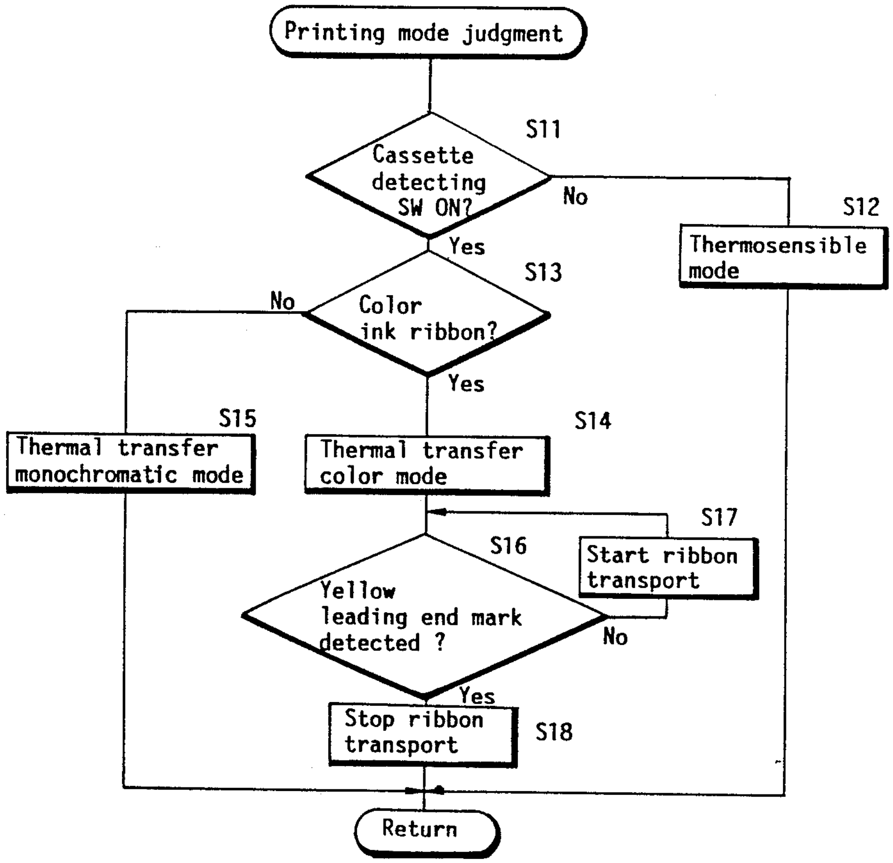
FIG. 10 is a flow chart showing a subroutine of a printing mode judgment operation.

FIG. 10 shows a subroutine of the printing mode judgment in step S2. At step S11, whether the ink ribbon 7 is loaded in the printer or not, that is, the cassette 8 is loaded in the printer or not is detected. This detection is effected by means of the claw 8*d* of the cassette 8. When the cassette 8 is not loaded in the printer, the program moves to step S12 where the printing mode is judged to be the thermosensible mode. On the other hand, when the cassette 8 is loaded, whether the ink ribbon 7 is a color ink ribbon or a monochromatic ink ribbon is judged at step S13. This judgment is effected in accordance with the black/white patterns of the mark detecting sensors 101 and 102 shown in Table 1. When the ink ribbon is a color ribbon, the program moves to step S14 where the printing mode is judged to be the thermal transfer color mode. When not, the program moves to step S15 where the printing mode is judged to be the thermal transfer monochromatic mode. The judgment result is stored in a buffer memory of a CPU. When the printing mode is the thermal transfer color mode, whether the yellow leading end mark My is detected or not is judged at step S16. If not, the program moves to step S17 to transport the ink ribbon until the mark My is detected. When the mark My is detected at step S16, the transportation of the ink ribbon 7 is stopped at step S18.

Figure 11A:
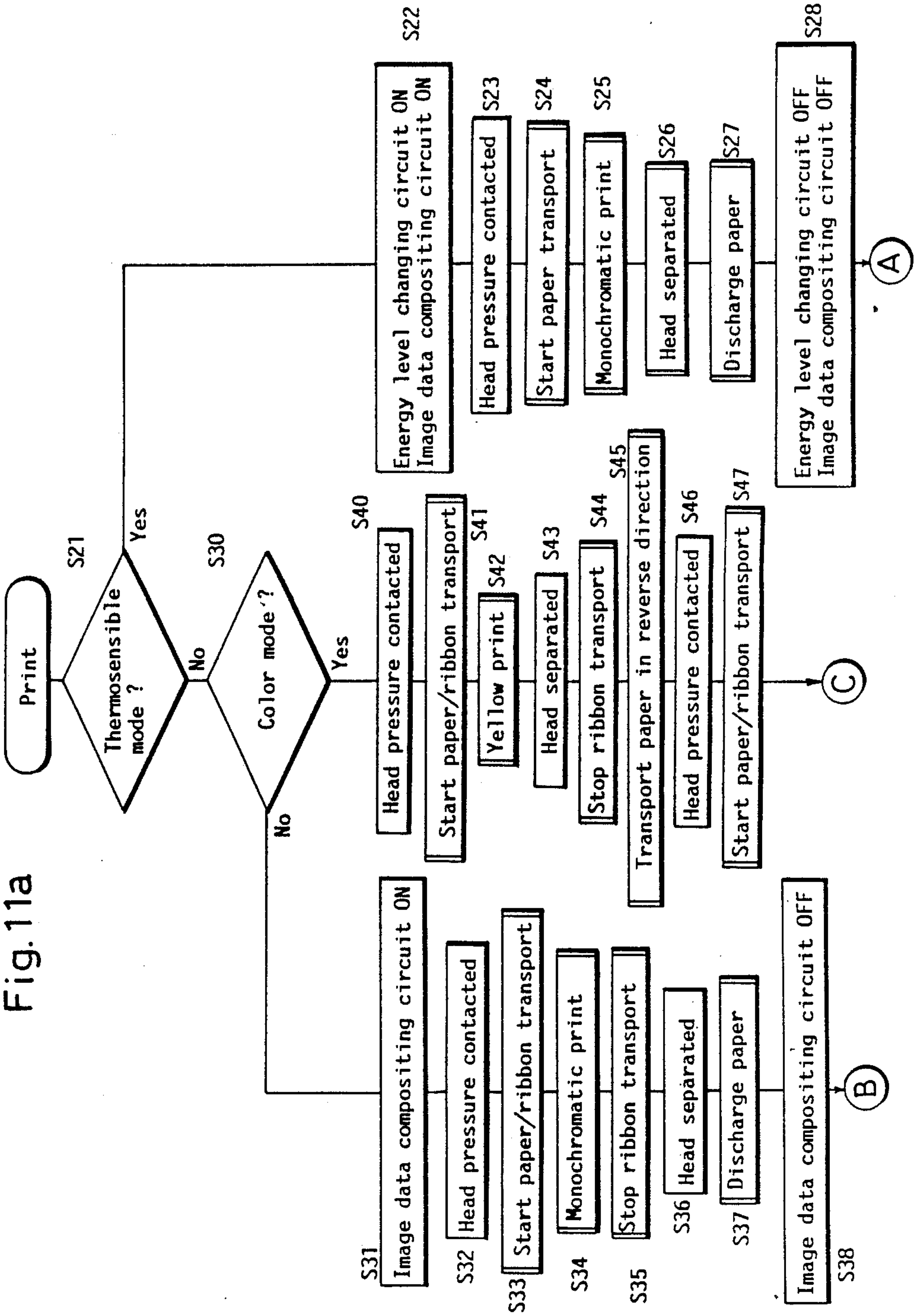
FIGS. 11a and 11b are flow charts showing a subroutine of a printing operation.
Figure 11B:
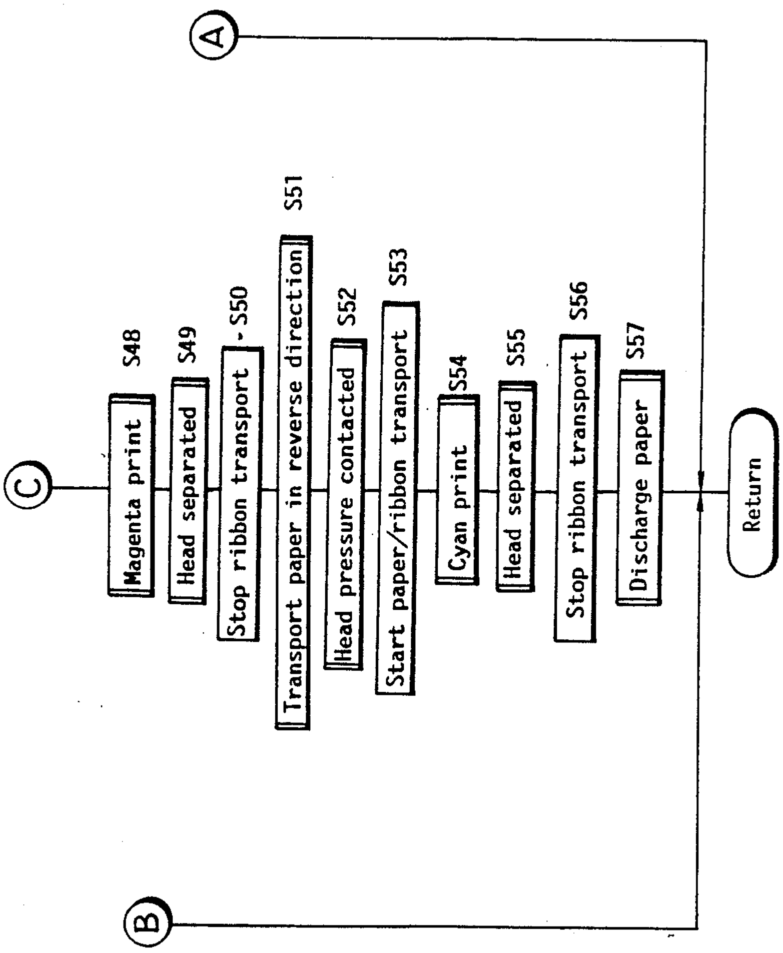

FIGS. 11*a* and 11*b* show subroutine of the printing operation in step S5. At step S21, whether the printing mode is the thermosensible mode or not is judged. When so, the program moves to step S22 where the energy level changing circuit is turned on to lower the level of energy applied to the thermal head 14 and where the image data compositing circuit is closed to form a monochromatic image by compositing color image data.

Next, the thermal head 14 is pressed upon the platen roller 16 at step S23 and the recording paper 17 is transported line by line at step S24. Then, monochromatic printing is effected at step S25. In this mode, since takeup of the ink ribbon is not necessary, electrification of the ink ribbon takeup motor is stopped. After the monochromatic printing operation is completed, the thermal head 14 is separated from the recording paper 17 at step S26 and the recording paper 17 is discharged by the paper feeder at step S27. Thereafter, at step S28, the energy level changing circuit and the image data compositing circuit are opened.

On the other hand, when the printing mode is not the thermosensible printing mode, whether the mode is the color mode or the monochromatic mode is judged at step S30. When the printing mode is the monochromatic mode, the program moves to step S31 where the image data compositing circuit is closed. In this case, since high level energy is required, the energy level changing circuit is not closed. After the thermal head 14 is pressed upon the platen roller 16 at step S32, the recording paper 17 and the ink ribbon 7 are transported line by line at step S33. Then, at step S34, the monochromatic printing is effected. When the printing operation is completed, the transportation of the ink ribbon 7 is stopped at step S35 and the thermal head 14 is separated from the platen roller 16 at step S36. Then, the recording paper 17 is discharged at step S37. Thereafter, the image data compositing circuit is opened at step S38.

When the printing mode is judged to be the thermal transfer color mode at step S30, the program moves to step S40 where the thermal head 14 is pressed upon the platen roller 16. Before this, the leading end of the yellow ink is stopped at the printing start position at steps S16 and S17. Then, the recording paper 17 and the ink ribbon 7 are transported line by line at step S41 and yellow data are read out of the image data memory to effect the printing operation with the yellow ink at step S42. When the printing with the yellow ink is completed, the thermal head 14 is separated from the platen roller 16 at step S43. Then, the ink ribbon 7 is transported until the magenta leading end mark Mm of the magenta ink is detected at step S44. When the mark Mm is detected, the transportation of the ink ribbon 7 is stopped at step S44 and the recording paper 17 is transported by a predetermined distance in the reverse direction at step S45. Subsequently, the thermal head 14 is pressed upon the platen roller 16 at step S46 and the recording paper 17 and the ink ribbon 7 are transported in synchronism with each other in the forward direction at step S47. Thus, the printing operation is effected with the magenta ink at step S48. When the printing operation with the magenta ink is completed, as in the case of the printing operation with the yellow ink, the thermal head 14 is separated from the platen roller 16 at step S49 and the ink ribbon 7 is transported until the cyan leading end mark Mc of the cyan ink is detected. When the mark Mc is detected, the transportation of the ink ribbon 7 is stopped at step S50. The recording paper 17 is transported by the predetermined distance in the reverse direction at step S51 and the printing operation with the cyan ink is effected at steps S52 through S54. In this way, the printing operation with three colors are completed. Then, the thermal head 14 is separated from the platen roller 16 at step S55 and the ink ribbon 7 is transported until the yellow leading end mark My is detected for a next printing operation. When them ark My is detected, the transportation of the ink ribbon 7 is stopped at step S56. Thereafter, the recording paper 17 is discharged at step S57.

Figure 12B:
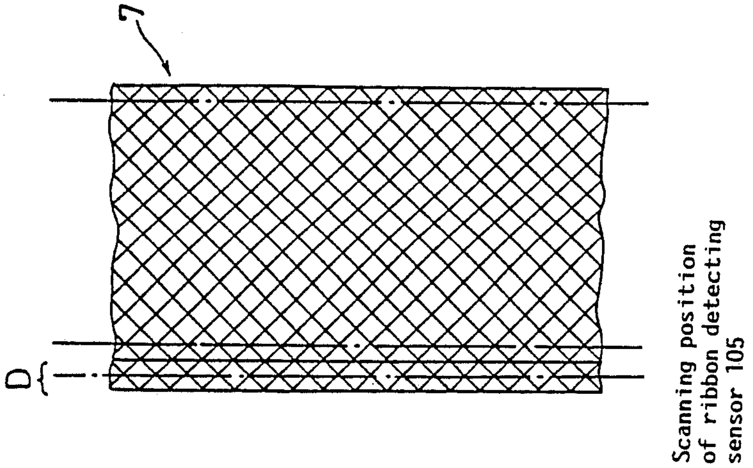
FIGS. 12a and 12b are plan views of ink ribbons according to another embodiment of the present invention.
Figure 12A:
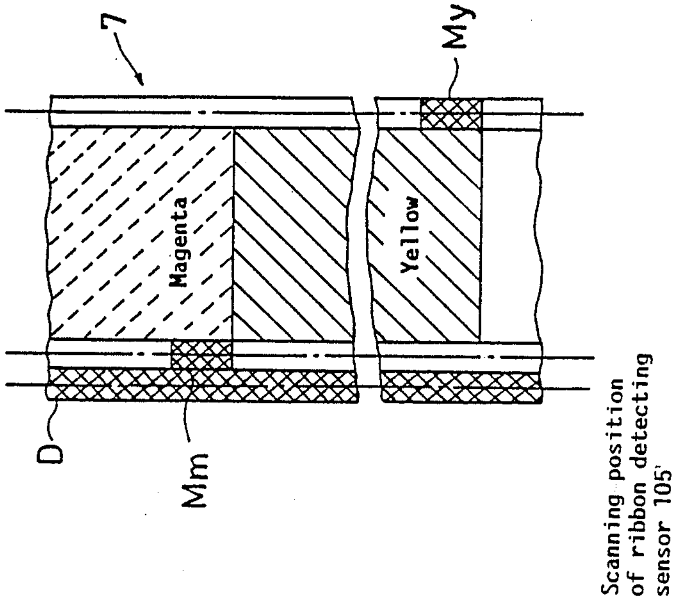
Figure 13:
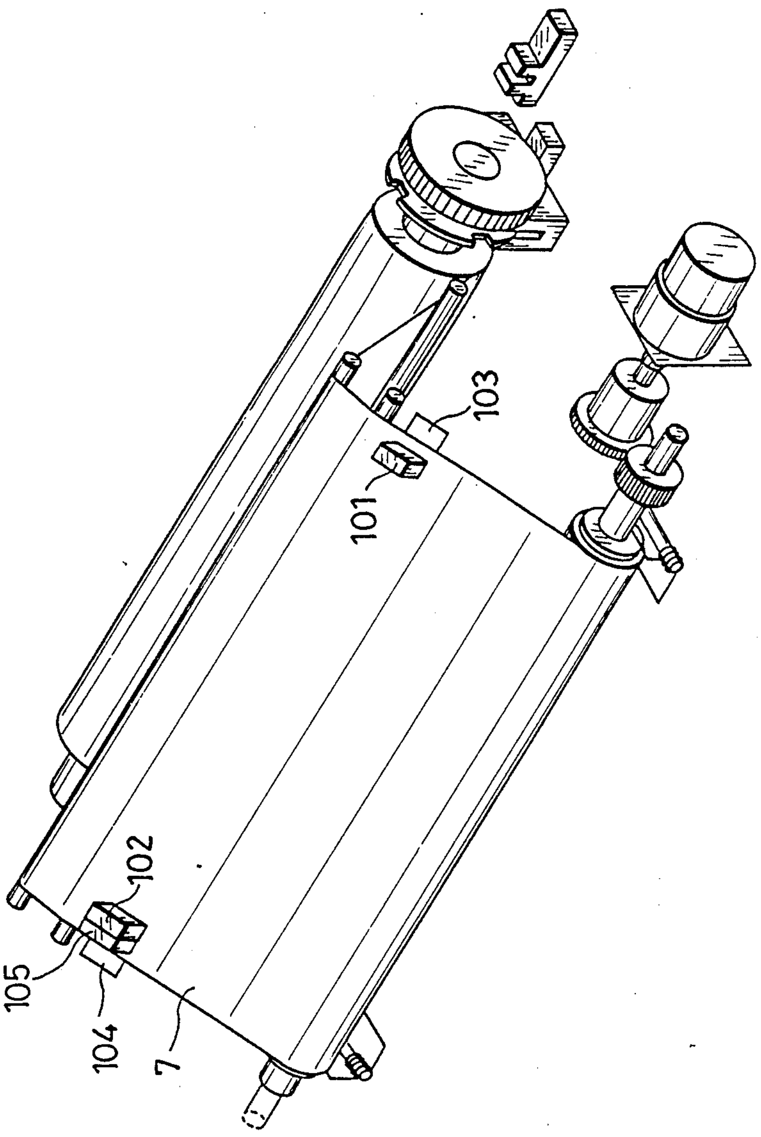
FIG. 13 is a view showing a construction for directly detecting the presence/absence of the above ink ribbon.

In the above embodiment, whether the ink ribbon 7 is loaded in the printer or not is detected by the presence/absence of the cassette 8. It is of course possible to directly detect the presence/absence of the ink ribbon. This detection is effected as follows. As shown in FIG. 12, the ink ribbon 7 has on one side thereof a strip ribbon detecting region D in black. On the other hand, as shown in FIG. 13, a ribbon detecting sensor 105 of a reflecting type is provided in the printer in order to detect the above region D.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A thermal printer for printing on a recording paper both in a thermal transfer printing mode with an ink ribbon and in a thermosensible printing mode without an ink ribbon comprising:

a thermal head;

energy applying means for applying energy to said thermal head for printing;

ink ribbon detecting means for detecting whether the ink ribbon is loaded in the printer or not;

automatic printing mode selecting means for selecting the thermal transfer printing mode when the ink ribbon is loaded in the printer and for selecting the thermosensible printing mode when the ink ribbon is not loaded in the printer;

ink ribbon transport means for transporting the ink ribbon; and driving prohibiting means for prohibiting driving of said ink ribbon transport means when the thermosensible printing mode is selected.

2. A thermal printer as claimed in claim 1, the ink ribbon extends from a supply roll to a takeup roll in a cassette.

3. A thermal printer as claimed in claim 1, wherein said ink ribbon transport means comprises:

spindles for supporting the takeup roll at an accurate position, said spindles being engaged in both ends of the takeup roll when the ink ribbon is loaded in the printer;

supporting mean for slidably supporting each of said spindles between a first position where said spindle is engaged in the end of the takeup roll and a second position where said spindle is separated from the end of the takeup roll; and a driving mechanism for driving the takeup roll when the takeup roll is supported by said spindles.

4. A thermal printer as claimed in claim 3, further comprising means for connecting said spindles to the takeup roll by pressing said spindles responsive to the loading operation of the cassette.

5. A thermal printer as claimed in claim 3, further comprising bearing members for supporting both ends of the supply roll at accurate positions, said bearing members being V-shaped recesses.

6. A thermal printer as claimed in claim 5, wherein each of said bearing members comprises a pair of members with a space therebetween in which a positioning flange provided on an end of the supply roll is engaged.

7. A thermal printer as claimed in claim 1, wherein said ink ribbon detecting means comprises:

a transmission type photosensor provided in the printer; and an interrupting member for interrupting the optical path of said photosensor, said interrupting member being provided in the cassette containing the ink ribbon.

8. A thermal printer as claimed in claim 1, wherein said ink ribbon detecting means comprises:

a strip mark provided along one side of the ink ribbon; and a mark detecting sensor for detecting said strip mark, said mark detecting sensor being provided in the printer.

9. A thermal printer as claimed in claim 1, further comprising judging means for judging whether the ink ribbon is a color ink ribbon or a monochromatic ink ribbon.

10. A thermal printer as claimed in claim 9, wherein said judging means comprises:

a plurality of reflection type photosensors provided in the printer at positions corresponding to both side portions of the ink ribbon;

a plurality of reflecting plates opposed to said plurality of reflecting type photosensors with the ink ribbon therebetween; and a discriminating circuit which discriminates the monochromatic ink ribbon by detection outputs of said reflection type photosensors when dark color marks formed on both sides of the monochromatic ink ribbon are positioned at detection areas of said photosensors and which discriminates the color ink ribbon by detection outputs of said photosensors when dark color marks formed at non-opposed positions on both sides of the color ink ribbon are positioned at the detection areas of said photosensors.

11. A thermal printer as claimed in claim 1, wherein said energy applying means changes the level of energy applied to said thermal head between the thermal transfer printing mode and the thermosensible printing mode.

12. A thermal printer for printing on a recording paper both in a thermal transfer printing mode with an ink ribbon and in a thermosensible printing mode without an ink ribbon, comprising:

a thermal head;

thermal head driving means for driving said thermal head for printing;

ink ribbon detecting means for detecting whether the ink ribbon is loaded in the printer or not;

printing mode selecting means for selecting the thermal transfer printing mode when the ink ribbon is loaded in the printer and for selecting the thermosensible printer mode when the ink ribbon is not loaded in the printer;

ink ribbon transport means for transporting the ink ribbon, said ink ribbon transport means including a drive motor; and control means for controlling said thermal head driving means and said ink ribbon transport means so that the drive motor of said ink ribbon transport means is not driven when a printing operation is executed in the thermosensible printing mode.

13. A thermal printer as claimed in claim 12, wherein said thermal head driving means changes the level of energy applied to said thermal head between the thermal transfer printing mode and the thermosensible printing mode.

14. In a thermal printer which forms an image on a recording paper in a thermal transfer printing mode with an ink ribbon transported by driving a motor of an ink ribbon transport mechanism and forms an image on a thermosensible paper in a thermosensible printing mode, the improvement comprising:

judgement means for judging whether or not an ink ribbon is loaded in the printer;

means responsive to said judgement means for selecting the thermosensible printing mode when the judgement means judges that an ink ribbon is not loaded in the printer; and means for prohibiting driving of said motor when the thermosensible printing mode is selected.

* * * * *